United States Patent [19]

Allen et al.

[11] Patent Number: 4,960,829

[45] Date of Patent: * Oct. 2, 1990

[54] ELASTOMERIC COMPOSITION

[75] Inventors: Ralph D. Allen, Naugatuck; Seshan Thiruvengada, Seymour; Frank C. Cesare, Woodbury; Harry D. Visser, Cheshire, all of Conn.

[73] Assignee: Uniroyal Chemical Company, Inc., Middlebury, Conn.

[*] Notice: The portion of the term of this patent subsequent to Jun. 27, 2006 has been disclaimed.

[21] Appl. No.: 223,749

[22] Filed: Jul. 25, 1988

Related U.S. Application Data

[63] Continuation of Ser. No. 866,854, May 23, 1986, abandoned.

[51] Int. Cl.$^5$ .................... C08L 9/00; C08L 23/16; C08L 23/26
[52] U.S. Cl. ............................. 525/193; 525/211; 525/237; 525/194; 525/289; 525/290; 525/313; 525/315
[58] Field of Search ............... 525/211, 237, 240, 193, 525/289, 313; 524/490, 483

[56] References Cited

U.S. PATENT DOCUMENTS

| | | | |
|---|---|---|---|
| Re. 32,028 | 11/1985 | Fischer | 525/197 |
| 3,364,155 | 1/1968 | Souffie | 525/211 |
| 3,378,512 | 4/1968 | Hamed et al. | 524/518 |
| 3,819,552 | 6/1974 | Glanville et al. | 524/518 |
| 3,819,592 | 6/1974 | Visser et al. | 260/80.78 |
| 3,884,993 | 5/1975 | Gros | 525/197 |
| 4,481,335 | 11/1984 | Stark | 525/261 |

*Primary Examiner*—Carman J. Seccuro
*Attorney, Agent, or Firm*—John A. Shedden

[57] ABSTRACT

Blends comprised of (A) a high molecular weight elastomeric polymer; (B) a sufficient amount of an ethylene/alphaolefin/nonconjugated polyene terpolymer having a number average molecular weight of between about 1,000 and about 15,000 such that the variety of the blend is at least about 5% lower than the viscosity of component (A) alone, and (c) a curative, exhibit increased processability, and, when cured, exhibit unexpectedly desirable tensile strength, ozone resistance and oil resistance.

6 Claims, No Drawings

ELASTOMERIC COMPOSITION

This is a continuation of application Ser. No. 866,854 filed May 23, 1986, now abandoned.

FIELD OF THE INVENTION

This invention is directed to a curable composition comprised of a blend of (A) an elastomer having a molecular weight of at least about 40,000; (B) a sufficient amount of ethylene/alphaolefin/nonconjugated polyene terpolymer having a molecular weight of between about 1,000 and about 15,000 such that the viscosity of the blend of components (A) and (B) is at least about 5% less than the viscosity of component (A) alone; and (C) a curative. In another aspect, this invention is directed to a process for forming an elastomer comprising such blend. When cured, the compositions of this invention exhibit unexpectedly improved resistance to extraction, high tensile strength and improved ozone resistance, and are thus suitable for many uses such as in precision molded parts, e.g. brake parts, corner molds, and nonstaining sponges.

BACKGROUND OF THE INVENTION

In the processing of high molecular weight elastomer compositions, it has become standard to employ plasticizers in order to decrease the viscosity and thereby to improve the workability of the composition. In general, extender oils such as mineral oils or paraffinic oils have been employed to plasticize rubber compounds.

However, the incorporation of such oils into the rubber composition, while effectively plasticizing such composition, will produce a number of deleterious effects upon the cured composition. Among these undesirable effects are decreased tensile strength, poor resistance to extraction and poor low temperature flexibility.

U.S. Pat. No. 3,819,592 to Visser at al discloses a process for producing liquid ethylene/propylene/(optionally) nonconjugated diene copolymers employing a vanadium salt-alkylaluminum halide catalyst and a molecular weight regulator which is a phosphorodithioate, a dithiocarbamate or a dithiocarbonate. This patent broadly discloses that curable liquid ethylene/alphaolefin/diene terpolymers can be utilized as adhesives, caulking compounds, sealants and plasticizing coagulants. However, Visser et al neither discloses any actual formulations nor provides any incentive in so employing such compounds.

It is elementary polymer chemistry that low molecular weight polymers will, upon curing, possess reduced tensile strength relative to higher molecular weight polymers. Consequently, the finding that the compositions of this invention, which comprise a blend of high and low molecular weight polymers, will exhibit increased tensile strength relative to compositions comprising high molecular weight polymer alone which has been plasticized with equivalent amounts of conventional extender oil is completely unexpected.

Accordingly, it is an object of this invention to provide an easily processable elastomer composition which, upon curing, exhibits unexpectedly high tensile strength.

It is a further object of this invention to provide an elastomer composition which, upon curing, exhibits unexpectedly desirable resistance to ozone and extraction.

It is yet another object of this invention to provide a process for compounding a high molecular weight elastomer such that the composition containing said elastomer will be easily processable and, upon curing, will exhibit unexpectedly desirable tensile strength, ozone resistance and resistance to extraction.

The above objects and other additional objects will become more fully apparent from the following description and accompanying Examples.

DESCRIPTION OF THE INVENTION

In one aspect, this invention is directed to a curable composition comprised of a blend of:
(A) an elastomer having a molecular weight of at least about 40,000;
(B) a sufficient amount of a terpolymer formed from the copolymerization of (i) ethylene; (ii) an alphaolefin having the formula $H_2C=CHR$ wherein R is $C_1$ to $C_{10}$ linear or branched alkyl; and (iii) a nonconjugated polyene; and having a molecular weight of between about 1,000 and about 15,000 such that the viscosity of the blend of components (A) and (B) is at least about 5% less than the viscosity of component (A) alone: and
(C) a sufficient amount of curative to cure components (A) and (B).

In another aspect, this invention is directed to a method of producing an elastomeric composition comprising the steps of:
(A) providing a high molecular weight elastomer having a molecular weight of at least about 40,000;
(B) blending with said high molecular weight elastomer with: (1) a sufficient amount of a terpolymer formed by the copolymerization of (i) ethylene, (ii) an alphaolefin having the formula $H_2C=CHR$ wherein R is $C_1$ to $C_{10}$ linear or branched alkyl; and (iii) a nonconjugated polyene, and having a molecular weight of between about 1,000 and about 15,000 such that the viscosity of the blend is at least about 5% less than the viscosity of the high molecular weight polymer alone; and (2) a sufficient amount of a curative to cure the composition;
(C) forming the blend produced in step (B) into a desired configuration; and
(D) subjecting said blend to curing conditions.

The composition of this invention is a blend comprised of (A) a high molecular weight elastomer: (B) an ethylene/alphaolefin/nonconjugated polyene terpolymer having a molecular weight of between about 1,000 and about 15,000; and (C) a curative.

The high molecular weight elastomers which may comprise component (A) include polymers having saturated and unsaturated backbones, optionally substituted with halogen, hydroxyl, carboxyl, nitrile or amino moieties.

Illustrative of the high molecular weight saturated hydrocarbon elastomers which may be employed are copolymers of ethylene with a copolymerizable monomer having the formula $CH_2=CHR$, wherein R is $C_1$–$C_{10}$ alkyl. Such copolymers may contain unsaturation due to the incorporation of non-conjugated dienes such as dicyclopentadiene, 5-ethylidene-2-norbornene, 1,4-hexadiene and the like. The non-conjugated diene content of the saturated rubbers employed may range from between 0 to about 20 weight percent. Alternatively, other saturated polymers such as butyl rubber, chlorinated polyethylene, and chlorosulfonated polyethylene may be employed. The preferred saturated rubber is ethylenepropylene diene terpolymer ("EPDM").

Illustrative of the high molecular weight unsaturated hydrocarbon elastomers which may utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferred unsaturated rubbers include natural rubber, cis-polyisoprene, polybutadiene, poly(styrenebutadiene), polychloroprene and poly(acrylonitrilebutadiene).

Alternatively or additionally, the high molecular weight elastomeric polymer, component (A), may comprise a silicone rubber or a fluorocarbon rubber. Moreover, blends of two or more high molecular weight elastomeric polymers may be employed.

The high molecular weight elastomeric polymers comprising component (A) of the composition of this invention possess a number average molecular weight of at least about 40,000. Preferably, such polymers possess a number average molecular weight of more than about 50,000, and most preferably of more than about 70,000.

The low molecular weight ethylene/alphaolefin/-non-conjugated polyene terpolymers, component (B), which may be employed are polymers of ethylene, at least one alphaolefin (of the formula $H_2C=CHR$, wherein R is a linear or branched alkyl radical comprised of from 1 to 10 carbon atoms) and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2norbornene, vinylnorbornene, cyclohexenylnorbornene and the like: alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin/-nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

In addition, the low molecular weight polymers employed in this invention may have incorporated therein and/or at the terminals thereof functional groups such as halogen, sulfo, sulfino, sulfinyl, cyano, epoxy, hydroxy, carboxy, COOR, $Si(OR)_3$, $Si(OOCR)_3$ (R being a hydrocarbyl radical having 1-18 carbon atoms) and the like. Such functional groups may be introduced either by replacement, addition or graft polymerization reactions well known to those skilled in the polymerization art.

The polymers employed in the composition of this invention are liquids at ambient temperatures, which are between about 20° and about 40° C. The term "liquid" is employed in conventional terms, that is that the polymer will have a definite volume, but will assume the shape of its container. More specifically, such low molecular weight polymers will be amenable to liquid handling techniques. Such liquid polymers will possess a number average molecular weight of from about 1,000 to about 15,000, with a preferred range of between about 2,000 and about 10,000, and a most preferred range of between about 4,000 and about 7,000.

As is employed herein, the term "curative" encompasses both curatives and curing systems. As is well known to those skilled in the art, the particular curatives which may be employed in a given composition is generally governed by the availability of unsaturation and/or functional groups present in the polymers to be cured. A wide variety of curatives and curing systems may be employed where applicable, such as free radical generating agents such as organic aromatic and aliphatic peroxides, including, for example, aromatic diacyl peroxides and aliphatic diacyl peroxides, dibasic acid peroxides, ketone peroxides, alkyl peroxyesters and alkyl hydroperoxides. Specific nonlimiting examples of useful organic peroxides and hydroperoxides include diacetylperoxide, dibenzoylperoxides; bis-2,4-dichloro benzoyl peroxide: ditert.-butyl peroxide; dicumylperoxide; tert.-butylperbenzoate: tert.-butylcumyl peroxide; 2,5-bis-(tert.-butylperoxy)-2,5-dimethylhexane; 2,5-bis-(tert.-butylperoxy)-2,5-dimethylhexyne-3: 4,4,4',4'-tetra-(tert.-butylperoxy)-2,2-dicyclohexylpropane; 1,4-bis-(tert.-butylperoxy-isopropyl)-benzene: 1,1-bis-(tert.-butylperoxy)-3,3,5-trimethylcyclohexane: lauroyl peroxide; succinic acid peroxide, cyclohexanone peroxide tert.-butyl peracetate and butyl hydroperoxide.

Also suitable in applicable cases are the azide curing agents including azidoformates, such as tetramethylenebis(azido-formate) and the like; aromatic polyazides, such as 4,4'-diphenylmethane diazide and the like; and sulfonazides such as p,p'-oxybis(benzene sulfonyl azide) and the like. Other curatives that may be used include the aldehydeamine reaction products such as formaldehyde-ammonia, formaldehyde-ethylchlorideammonia, acetaldehyde-ammonia, formaldehyde-aniline, butyraldehyde-aniline, heptaldehyde-aniline, heptaldehyde-formaldhyde-aniline, hexamethylenetetramine, alpha-ethyl-beta-propylacrolein-aniline and the like; substituted ureas, such as trimethylthiourea, diethylthiourea, dibutylthiourea, tripentylthiourea, 1,3-bis(benzothiazolyl-mercaptomethyl)urea, N,N-diphenylthiourea and the like: guanidines, such as diphenylguanidine, di-otolylguanidine, diphenylguanidine phthalate, the di-o-tolyguanidine salt of dicatechol borate and the like: xanthates, such as zinc ethylxanthate, sodium isopropylxanthate, butylxanthic disulfide, potassium isopropylxanthate, and zinc butylxanthate and the like: dithiocarbamates, such as copper dimethyl-, zinc dimethyl-, tellurium diethyl-, cadmium dicyclohexyl-, lead dimethyl-, selenium dibutyl-, zinc pentamethylene-, zinc didecyl-, zinc isopropyloctyldithiocarbamate and the like: thiazoles, such as 2-mercaptobenzothiazole, zinc mercaptothiazolyl mercaptide, 2-benzothiazoly-N,N-diethylthiocarbamyl sulfide, 2,2'-dithiobis(benzothiazole) and the like; imidazoles, such as 2-mercaptoimidazoline, 2-mercapto-4,4,6-trimethyldihydropyrimidine) and the like: sulfenamides such as N-t-butyl-2-benzothiazole-, N-cyclo-hexylbenzothiazole-, N,N-diisopropyl-benzothiazole-, N-(2,6-dimethylmorpholino)-2-benzo-thiazole-sulfenamide and the like: thiuramdisulfides, such as N,N'-diethyl-, tetrabutyl-, N,N'-diisopropyldioctyl-, tetramethyl-, N,N'-dicyclohexyl-, N,N'-tetralaurylthiuramidsulfide and the like; paraquinonedioxime, dibenzoparaquinonedioxime and the like and sulfur itself. (See Encyclopedia of Chemical Technology, vol. 17, 2nd edition, Interscience Publishers, 1968: also Organic Peroxides, Daniel Swern, vol. 1, Wiley-Interscience, (1970).

When a peroxide curative is employed, such curative may be used alone or with auxiliary substances such as sulfur: maleimides, including bis-maleimides: polyunsaturated compounds, such as cyanurate and the like; acrylic esters, such as trimethylolpropane trimethacrylate and the like; organic transition metal salts, such as cobalt octoate, cobalt naphthenate, copper stearate, chromium laurate and the like; and tertiary amines, such as tributylamine, and dimethyloctylamine and the like.

When using sulfur as a curative (whether in its elemental form or in the form of a sulfur donor, e.g., 4,4-dithiomorpholine), it is desirable to include an accelerator and an activator (e.g., a metal salt or oxide).

Mixed peroxide-type or mixed-sulfur-type curing systems may be employed. These include dicumyl-peroxide plus 2,5-bis-(tert.-butylperoxy)-2,5-dimethyl-hexane or sulfur plus tetramethylthiuramidsulfide plus dicumyl peroxide. See "Vulcanization and Vulcanizing Agents," W. Hoffman, Palmerton Publishing Co., New York, 1967, for an extensive disclosure of curing agents.

Further, one particularly preferred curative is comprised of (i) at least one member of the group consisting of sulfur and sulfur donor compounds: (ii) at least one member of the group selected from organic peroxides and hydroperoxides; and (iii) a sulfur cure accelerator. Particularly preferred sulfur cure accelerators in such tri-component curatives are sulfenamides.

The curatives of the composition of this invention are present in an amount effective to cure the polymer of such composition. Typically, such curatives will be present in amounts of between about 0.5 and about 5 parts by weight per 100 parts of polymer.

In addition to the high molecular weight elastomeric polymer, low molecular weight terpolymer, and curing agent described above, the blends of this invention may further comprise reinforcing agents, fillers, processing aids, extender oils, plasticizers, antioxidants, ultraviolet stabilizers, cross-linking agents and the like, all of which addtional components are well known to those skilled in the rubber art.

The low molecular weight ethylene/alphaolefin/-non-conjugated polyene terpolymer is present in an amount such that the viscosity of the blend of components (A) and (B) is at least about 5% lower than if such component (B) were not present. Generally, a minor amount (i.e., less than about 50% by weight based upon the weight of the entire composition) of component (B) is present. Although the preferred amount of component (B) in any given composition will vary in accordance with the particular high molecular weight elastomeric polymer employed (i.e., component A), the particular low molecular weight terpolymer, employed (i.e., component B), and the amount and composition of other additives included, in most instances component (B) will typically preferably comprise between about 5 and about 50, more preferably between about 10 and about 40 weight percent of the total weight of components (A), (B) and (C).

The blend of this invention is typically prepared by first mixing all the ingredients except the curing agent in a suitable mixing device (such as a Banbury [trademark] type internal mixer, a two roll mill, or the like). Such mixing will typically require about 5 minutes, although shorter or longer mixing periods may be employed. This mixing may be performed at temperatures ranging from room temperature or cooler up to about 180° C. If mixing temperatures above the activation temperature of the curing agent are employed, upon completion of the mixing the blended rubber is cooled or allowed to cool to temperature below such activation temperature. The curing agent is then incorporated into the blend by subsequent mixing or milling.

Alternatively, the blend of this invention may be prepared by formulating a high molecular weight polymer component and a low molecular weight polymer component and blending desired amounts of the two components together. In this alternative embodiment, the location of the elements of the curing agent or of the curative is not critical, with any or all such elements or such curative being blended in either the high molecular weight component, the low molecular weight component, or both.

Vulcanization of the blend may be carried out in a press, an oven or other suitable means until crosslinking has occured to a satisfactory state of cure.

The cured compositions of this invention exhibit unexpectedly desirable tensile strength, high resistance to extraction and high ozone resistance and are thus highly suitable for use in precision molded parts, e.g., brake parts, corner molds, and nonstaining sponges.

EXAMPLES

The following Examples are intended to further illustrate the invention and are not intended to limit the scope of the invention in any manner.

Examples 1–4 and Comparative Experiments A and B

Employing the ingredients indicated in Table I, (which are listed in parts per hundred by weight) several rubber compositions were produced as follows:

Elastomers, liquid EPDM, carbon black (N-774), zinc oxide and an antioxidant in the amounts listed in Table I were charged to a Banbury type B internal mixer. Mixing was continued until the temperature reached 154° C, then the mixing was stopped and the inside of the mixer was swept. Blending was then resumed for one more minute and the stock was removed from the mixer.

The curative ingredients (trimethylol propane trimethacrylate and dicumyl peroxide) were incorporated in the cooled rubber stocks on a mill, with care being taken not to exceed 105° C. stock temperature.

Samples of the materials of Examples 1–4 and Comparative Experiments A and B were cured 30 minutes at 165° C. and tested for their physical properties. The results appear in Table II. These same samples were given an additional hot air post cure at 204° C for 30 minutes. The results of this additional post cure appear in Table III below.

TABLE I

|  | Example or Comparative Experiment | | | | | |
|---|---|---|---|---|---|---|
|  | A | B | 1 | 2 | 3 | 4 |
| EPDM[1] | 100 | 100 | 95 | 90 | 75 | 90 |
| EPDM - Liquid[2] | — | — | 5 | 10 | 25 | 10 |

TABLE I-continued

|  | Example or Comparative Experiment | | | | | |
| --- | --- | --- | --- | --- | --- | --- |
|  | A | B | 1 | 2 | 3 | 4 |
| Zinc Oxide | 5 | 5 | 5 | 5 | 5 | 5 |
| Carbon Black N-774 | 60 | 60 | 60 | 60 | 60 | 60 |
| Antioxidant[3] | 1 | 1 | 1 | 1 | 1 | 1 |
| Co-curing Agent[4] | 2 | 2 | 2 | 2 | 2 | 2 |
| Plasticizer[5] | 10 | — | — | — | — | — |
| Dicumyl Peroxide, 40% | 7 | 7 | 7 | 7 | 7 | 8 |
|  | 185.0 | 175.0 | 175.0 | 175.0 | 175.0 | 176.0 |
| Mooney Data |  |  |  |  |  |  |
| Mooney Viscosity, ML-4 at 100° C. | 69 | 84 | 74 | 68 | 47 | 68 |
| Mooney Scorch, MS at 125° C. | 13 | 13 | 14 | 13 | 12 | 11 |

Remarks:
[1]Ethylene-Propylene-5-ethylidene-2-norbornene terpolymer: E/P Wt. Ratio = 57/43; Mooney Viscosity (ML1 + 4 at 100° C.) = 53; Molecular weight$_n$ (Mn) approx. 70,000.
[2]Ethylene-Propylene-Dicyclopentadiene terpolymer: Iodine No. = 24; Molecular Weight = 6100
[3]Polymerized trimethyldihydroquinoline Naugard ™ Q Uniroyal Chemical Co., Inc.
[4]Trimethylol propane trimethyacrylate SR-350 ™ Sartomer Resins, Inc.
[5]Paraffinic Oil, ASTM D2226 Type 104B Sp. gr. 0.8916, Aromatics 23.5% Sunpar ™ 2280, Sun Oil Co.

TABLE II

|  | Example or Comparative Experiment | | | | | |
| --- | --- | --- | --- | --- | --- | --- |
|  | A | B | 1 | 2 | 3 | 4 |
| Unaged Physical Properties, Cured at 30 minutes at 165° C. | | | | | | |
| Room Temperature | | | | | | |
| 200% Modulus, psi | 1510 | 2330 | 1840 | 1740 | 1630 | 1550 |
| 200% Modulus, MPa | 10.4 | 16.1 | 12.7 | 12.0 | 11.2 | 10.6 |
| Tensile Strength, psi | 2520 | 2830 | 2760 | 2860 | 2470 | 2600 |
| Tensile Strength, MPa | 17.4 | 19.5 | 19.0 | 19.7 | 17.0 | 17.9 |
| Elongation, % at Break | 300 | 240 | 240 | 270 | 270 | 200 |
| Hardness, Shore A | 69 | 72 | 71 | 69 | 69 | 70 |
| Tear Strength, Die C, ppi | 250 | 220 | 200 | 220 | 210 | 210 |
| Tear Strength, Die C, kN/m | 43.8 | 38.5 | 35.0 | 38.5 | 36.8 | 36.8 |
| Percent Volume Change - Fluid Aged - Immersion in Delco Supreme #11 Brake Fluid | | | | | | |
| 22 Hours at 150° C. | +2.0 | +3.0 | +5.3 | +5.3 | +5.3 | +5.2 |
| 7 Days at 24° C. | −0.1 | +0.4 | +0.1 | +0.1 | +0.1 | +0.1 |
| Chloroform Acetone Extract, % | 7.7 | 3.1 | 2.9 | 3.0 | 3.8 | 2.9 |

TABLE III

|  | Example or Comparative Experiment | | | | | |
| --- | --- | --- | --- | --- | --- | --- |
|  | A | B | 1 | 2 | 3 | 4 |
| Cured 30 Minutes at 165° C. Plus 30 Minutes at 204° C. Air Post Cure | | | | | | |
| Room Temperature | | | | | | |
| 200% Modulus, psi | 1350 | 2010 | 1940 | 1680 | 1680 | 2410 |
| 200% Modulus, MPa | 93 | 13.8 | 13.4 | 11.6 | 11.6 | 16.6 |
| Tensile Strength, psi | 2660 | 3020 | 2940 | 2750 | 2650 | 2800 |
| Tensile Strength, MPa | 13.3 | 20.8 | 20.3 | 18.9 | 18.3 | 19.3 |
| Elongation, % at Break | 340 | 270 | 260 | 260 | 270 | 220 |
| Hardness, Shore A | 69 | 72 | 73 | 70 | 71 | 73 |
| Tear Strength, Die C, ppi | 250 | 230 | 220 | 230 | 220 | 210 |
| Tear Strength, Die C, kN/m | 43.8 | 40.3 | 38.5 | 40.3 | 38.5 | 36.8 |

The data above are noteworthy in several respects. Preliminarily, it is seen that the Mooney viscosity of the high molecular weight polymer is considerably reduced —and thus the processability of the blend considerably improved —by the addition of small amounts of low molecular weight polymer. Thus, a comparison of Example 1 with Comparative Experiment B shows a reduction in viscosity of about 11% with the incorporation of only 5% by weight of low molecular weight EPDM.

Moreover, the above data show that for a composition of a given processability (i.e., viscosity), the compositions of this invention —which are comprised of low and high molecular weight polymers —upon curing exhibit unexpectedly higher tensile strength than do prior art oil extended compositions composed of high molecular weight polymer alone. Specifically, a comparison of Example 2 with Comparative Experiment A indicates that although these compositions have a similar viscosity (68 vs 69 respectively) the tensile strength of the cured composition of this invention is unexpectedly higher (2860 psi vs 2520 psi after being cured for 30 minutes at 165° C.: 2750 psi vs 2660 psi after being cured for 30 minutes at 165° C. plus 30 minutes at 204° C. hot air post cured).

Further, the above data indicate the reduced amount of extraction exhibited by the compounds of this invention —an essential result in many uses, such as in brake compositions, where high extraction is undesirable.

Examples 5 and 6 and Comparative Experiments C and D

In order to show the ozone resistance of the compositions of this invention, a series of blends were prepared by coflocculating the ingredients shown in Table IV below. Samples of the blends were cured for 15 minutes at 350° F. (176° C.) and their physical properties measured. The results of such testing are summarized in Table V.

TABLE IV

|  | Example or Comparative Experiment | | | |
| --- | --- | --- | --- | --- |
|  | 5 | 6 | C | D |
| Natural Rubber | 60 | 60 | 60 | 60 |
| SBR-1500 | 15 | 15 | 15 | 15 |
| High MW EPDM[1] | 20 | 20 | 25 | 20 |
| Liquid EPDM-1[2] | 5 | — | — | — |
| Liquid EPDM-2[3] | — | 5 | — | — |
| Liquid EP[4] | — | — | — | 5 |
| Carbon Black, N-550 | 35 | 35 | 35 | 35 |
| Extender Oil (Circosol 4240) | 5 | 5 | 5 | 5 |
| Zinc Oxide | 5 | 5 | 5 | 5 |
| Stearic Acid | 1 | 1 | 1 | 1 |
| Sunproof Imp[5] | 5 | 5 | 5 | 5 |
| Delac NS[6] | 1 | 1 | 1 | 1 |
| Sulfur | 2.6 | 2.6 | 2.6 | 2.6 |

Remarks:
[1]High MW EPDM: Termonomer = dicyclopentadiene; ML 1 + 4 = 40 at 125° C.; E/P ratio = 68/32; Molecular weight (Mn) = 45,000
[2]EPDM-1: Termonomer = dicyclopentadiene; IV (tetralin 135° C.) = 0.16; Molecular weight approximately 2800
[3]EPDM-2: Termonomer = 5-ethylidene-2-norbornene; IV (tetralin 135° C.) = 0.21; Molecular weight approximately 4500
[4]EP: IV (tetralin 135° C.) = 0.14; Molecular weight approximately 2300
[5]A mixture of micro and paraffinic waxes
[6]t-butylbenzothiazole sulfenamide

TABLE V

|  | Example or Comparative Experiment | | | |
| --- | --- | --- | --- | --- |
|  | 5 | 6 | C | D |
| Natural Rubber | 60 | 60 | 60 | 60 |
| SBR-1500 | 15 | 15 | 15 | 15 |
| High MW EPDM | 20 | 20 | 25 | 20 |
| Liquid EPDM-1 | 5 | — | — | — |
| Liquid EPDM-2 | — | 5 | — | — |
| Liquid EP | — | — | — | 5 |
| Bent Loop (Ozone Resistance) 50 pphm/100° F., hours ASTM D518 Method B | 1000+ | 1000+ | 2 | 24 |
| Tensile, psi | 1710 | 1790 | 1680 | 1260 |

TABLE V-continued

| | Example or Comparative Experiment | | | |
|---|---|---|---|---|
| | 5 | 6 | C | D |
| 300% Modulus, psi | 730 | 590 | 820 | 400 |
| Elongation, % | 550 | 590 | 510 | 660 |

The above data indicate the improved ozone resistance as well as the unexpectedly improved tensile strength exhibited by the compositions of this invention.

What is claimed is:

1. A solvent-free, curable elastomeric molding composition resistant to weight loss through extraction comprising:
   (a) in the absence of a solvent, an uncured ethylene-propylene polymer as high molecular weight hydrocarbon elastomer in said composition, said polymer having a non-conjugated diene content of between 0 and about 20 weight percent, and having a molecular weight of at least about 40,000;
   (b) between about 5 and 25 weight percent based on (a) plus (b) of a low molecular weight ethylene/alphaolefin/non-conjugated polyene terpolymer which is liquid at ambient temperatures, having an ethylene content between 25 and 85 percent by weight and a molecular weight between about 1,000 and about 15,000, said low molecular weight terpolymer being catalyzed using a vanadium salt and alkyl aluminum halide catalyst with a molecular weight regulator selected from the group consisting of phosphorodithioate, dithiocarbamate and dithiocarbonate, said low molecular weight polymer in said composition; and
   (c) a sufficient amount of curative intimately admixed to cure the uncured high molecular weight hydrocarbon elastomer and the low molecular weight terpolymer, and to provide resistance to weight loss through minimal extraction of said low molecular weight terpolymer.

2. The elastomeric composition of claim 1 further comprising: one or more high molecular weight conjugated diene-based hydrocarbon elastomers.

3. The elastomeric composition of claim 2 wherein at least one of said one or more high molecular weight conjugated diene-based unsaturated hydrocarbon elastomers is selected from the group consisting of natural rubber, cis polyisoprene, polybutadiene, poly (styrene-butadiene), poly(acrylonitrile-butadiene), and polychloroprene.

4. An ozone resistant, curable elastomeric composition comprising:
   (a) a high molecular weight unsaturated hydrocarbon elastomer derived from a conjugated diene subject to ozone degradation;
   (b) in the absence of a solvent, an uncured ethylene-propylene polymer as a second high molecular elastomeric in said composition, said second elastomer having a non-conjugated diene content of between 0 and about 20 weight percent, and having a molecular weight of at least about 40,000;
   (c) between about 5 and 25 weight percent based on (a), (b) and (c), of a low molecular weight ethylene/alphaolefin/non-conjugated polyene terpolymer which is liquid at ambient temperatures, having an ethylene content between 25 and 85 percent by weight and a molecular weight between 1,000 and about 15,000, said low molecular weight terpolymer being catalyzed using a vanadium salt and alkyl aluminum halide catalyst with a molecular weight regulator selected from the group consisting of phosphorodithiote, dithiocarbamate and dithiocarbonate, said low molecular weight terpolymer being the sole low molecular weight polymer in said composition; and
   (d) a sufficient amount of curative intimately admixed to cure (a), (b), and (c) and to provide resistance to weight loss through minimal extraction of said low molecular weight terpolymer.

5. The elastomeric composition of claim 4 wherein said high molecular weight conjugated diene-based unsaturated hydrocarbon elastomer is selected from the group consisting of natural rubber, cis polyisoprene, polybutadiene, poly(styrene-butadiene), poly(acrylonitrile-butadiene), and polychloroprene.

6. A method of molding an elastomeric article resistant to weight loss by solvent extraction comprising:
   (a) preblending 5 to 25 weight percent of polymer of a liquid low molecular weight terpolymer total weight a high molecular weight elastomer to form a homogenous mixture in the absence of a solvent, said high molecular weight polymer being an uncured ethylenepropylene non-conjugated diene terpolymer having a non-conjugated diene content of between 0 and about 20 weight percent and a molecular weight of at least 40,000, said liquid, low molecular weight terpolymer being a low molecular weight ethylene/alphaolefin/non-conjugated polyene terpolymer having an ethylene content between 25 and 85 percent by weight, molecular weight between about 1,000 and about 15,000, said low molecular weight terpolymer being catalyzed using a vanadium salt and alkyl aluminum halide catalyst with a molecular weight regulator selected from the group consisting of phosphorodithioate, dithiocarbamate and dithiocarbonate;
   (b) blending into said homogeneous mixture a curative in an amount sufficient to cure the high molecular weight elastomer and low molecular weight terpolymer to form a molding composition resistant to solvent extraction of the low molecular weight terpolymer;
   (c) forming said molding composition to form a desired conformation; and
   (d) heating said conformation to effect vulcanization of both said high molecular weight elastomer to form an elastomeric article thereby preventing solvent extraction of said liquid low molecular weight terpolymer from said article.

* * * * *